US012276138B2

(12) United States Patent
Waldmann

(10) Patent No.: US 12,276,138 B2
(45) Date of Patent: Apr. 15, 2025

(54) MOTOR VEHICLE LOCKING DEVICE

(71) Applicant: Kiekert AG, Heiligenhaus (DE)

(72) Inventor: Thomas Waldmann, Mülheim (DE)

(73) Assignee: Kiekert AG, Heiligenhaus (DE)

(*) Notice: Subject to any disclaimer, the term of this patent is extended or adjusted under 35 U.S.C. 154(b) by 493 days.

(21) Appl. No.: 17/625,865

(22) PCT Filed: Jun. 30, 2020

(86) PCT No.: PCT/DE2020/100567
§ 371 (c)(1),
(2) Date: Jan. 10, 2022

(87) PCT Pub. No.: WO2021/008651
PCT Pub. Date: Jan. 21, 2021

(65) Prior Publication Data
US 2022/0259896 A1 Aug. 18, 2022

(30) Foreign Application Priority Data
Jul. 16, 2019 (DE) ..................... 10 2019 119 256.0

(51) Int. Cl.
*E05B 77/26* (2014.01)

(52) U.S. Cl.
CPC .................................. *E05B 77/265* (2013.01)

(58) Field of Classification Search
CPC .. E05B 77/265; E05B 77/283; E05B 15/0053; E05B 15/006; E05B 15/008; E05B 2015/0468; E05B 17/2007; E05B 17/2015; E05B 17/2019; E05B 17/2034; E05B 17/2053; E05B 35/008; Y10T 292/869; Y10T 292/93; Y10T 292/96
See application file for complete search history.

(56) References Cited

U.S. PATENT DOCUMENTS

| | | | | |
|---|---|---|---|---|
| 10,280,655 | B2 * | 5/2019 | Dragon | E05B 77/265 |
| 11,280,116 | B2 * | 3/2022 | Scarfone | E05B 15/008 |

FOREIGN PATENT DOCUMENTS

| | | | | |
|---|---|---|---|---|
| DE | 102007055413 | A1 | 5/2009 | |
| DE | 102014114347 | A1 | 4/2016 | |
| DE | 102017111704 | A1 * | 12/2018 | E05B 15/0053 |
| WO | 2006054759 | A1 | 5/2006 | |
| WO | 2018145693 | A1 | 8/2018 | |

OTHER PUBLICATIONS

International Search Report mailed Oct. 6, 2020, for priority International Patent Application No. PCT/DE2020/100567.

* cited by examiner

*Primary Examiner* — Gilbert Y Lee
*Assistant Examiner* — Yahya Sidky
(74) *Attorney, Agent, or Firm* — Renner, Otto, Boisselle & Sklar, LLP

(57) ABSTRACT

The invention relates to a motor vehicle locking device comprising a locking mechanism having a rotary latch and at least one pawl, an actuating lever mechanism acting on the pawl, and a child safety device having a control element (1), wherein the control element (1) is latchable in at least two latching positions (R1, R2), and a spring element (3) on the control element (1), wherein the spring element (3) interacts with a control cam (2) in such a way that the control element (1) is adjustable in a spring-loaded manner into the latching positions (R1, R2), and wherein the spring element (3) is designed as a spring lip (3).

12 Claims, 1 Drawing Sheet

MOTOR VEHICLE LOCKING DEVICE

This application is a national phase of International Application No. PCT/DE2020/100567 filed Jun. 30, 2020, which claims priority to German Patent Application No. 10 2019 119 256.0 filed Jul. 16, 2019, the entire disclosures of which are hereby incorporated by reference.

FIELD OF DISCLOSURE

The invention relates to a motor vehicle locking device comprising a locking mechanism having a rotary latch and at least one pawl, an actuating lever mechanism acting on the pawl, and a child safety device having a control element, wherein the control element is latchable in at least two positions, and a spring element on the control element, wherein the spring element interacts with a control cam in such a way that the control element is adjustable in a spring-loaded manner into the latching position.

BACKGROUND OF DISCLOSURE

Motor vehicle locking devices with an integrated child safety device are usually provided on rear side doors in motor vehicles in order to disable the inside door handles in a "child safety lock on" position. In contrast, the side door in question can still be opened from the outside because the outside door handle remains activated. The "child safety lock on" position of the child safety device or the child safety lever corresponds to the previously mentioned selective deactivation of the inside door handle, which as a result is ineffective and is not able to open a locking mechanism located in the motor vehicle locking device. In contrast, the "child safety lock off" position of the child safety device corresponds to the fact that the inside door handle is activated and consequently the pawl can lift off from the rotary latch via the actuating lever mechanism. As a result, the associated motor vehicle side door can be opened without problems, both from the inside and the outside. This functionality has basically proven itself and can, of course, also be transferred and expanded to other motor vehicle doors.

In order to be able to engage the child safety device manually from the outside, so-called switching nuts are often used, wherein a key can be engaged in this switching nut, for example, and the child safety lock can be engaged or disengaged. In most cases, the switching nut is pivoted for this purpose. In order to be able to safely assume the end positions of the child safety lock, a child safety device has become known from DE 10 2014 114 347 A1 in which the child safety lever can be positioned by means of a spring and in cooperation between the spring and a stationary pin. For this purpose, the child safety lever has a guide groove, wherein the guide groove has different widths, so that the pin can be adjusted into its end positions.

Another control element of a child safety device is known from DE 10 2017 111 704 A1. For this purpose, a control element which is pivotably accommodated in a motor vehicle lock has a spring element which is integrally formed on the control element, wherein the spring element engages in a control contour. The spring element is made of plastics material and has a web-like, V-shaped edge that interacts with grooves in the control contour. When the control element is adjusted or pivoted, the spring element is elastically deformed and, through the formation of the control contour, supports the adjustment into the different latching positions.

The state of the art also includes a locking system, in particular a door lock, as described in the context of DE 10 2007 055 413 A1. This locking system has a rotating body on which it can be pivoted between a first stable position and a second stable position. A spring element is deflected along an associated movement path.

SUMMARY OF DISCLOSURE

The known designs of child safety devices have basically proven their worth, but then come up against their limits when high standards, that is to say high actuating forces, are required for long-term stability of the child safety devices. In these cases in particular, plastics are used that have a higher strength and/or toughness, which in turn represents a design challenge with regard to permanent elasticity. This is where the invention starts from.

One object of the invention is to provide a child safety device which enables the latching positions to be reached safely and, in particular, in a long-term stable manner, even with less elastic materials and higher spring forces. In addition, it is an object of the invention to provide a structurally simple and inexpensive child safety device which is thus improved overall for a motor vehicle locking device.

The object is achieved by the features of the independent claim 1. Advantageous embodiments of the invention are specified in the dependent claims. It should be noted that the exemplary embodiments described below are not limiting; rather, any possible variations of the features described in the description, the dependent claims and the drawings are possible.

According to claim 1, the object of the invention is achieved in that a motor vehicle locking device is provided, comprising a locking mechanism with a rotary latch and at least one pawl, an actuating lever mechanism acting on the pawl and a child safety device with a control element, wherein the control element is latchable in at least two positions, and a spring element on the control element, wherein the spring element interacts with a control cam in such a way that the control element can be adjusted in a spring-loaded manner into the latching positions, and wherein the spring element is designed as a spring lip. The construction of the child safety device according to the invention now creates the possibility of also using inelastic materials, that is to say, for example, plastics materials with a glass fiber content, in the region of the child safety device. The resilience of the spring lip increases due to the glass fiber content in the plastic, which means that the latching positions can be reached safely and in a long-term stable manner.

Starting from the control element, the spring lip extends in the direction of a control contour, wherein in an advantageous embodiment variant the spring lip has a thickened portion which can be brought into engagement with the control contour. In this case, the spring lip has at least one elongate extension which, starting from the control element, extends at least in some regions along the control element, so that a sufficient spring deflection can be achieved for the spring lip.

Depending on the toughness or strength of the plastics material used, the extension of the spring lip along the control element and preferably along an axial extension of the control element can have different lengths. A safety measure is additionally integrated into the child safety locking device by means of the thickened portion, which can in particular be a spring tab. Thus, not only does the spring lip have to cooperate with the control contour, but there is also the possibility of forming the thickened portion in such a way that a secure form fit can be achieved in the latching positions in interaction with the control contour. The thickened portion preferably has a conical shape, wherein the thickened portion tapers starting from the spring lip in the direction of the control contour; in other words, the thickened portion on the spring lip can be formed conically in the direction of the control contour.

In a further embodiment variant of the invention, the spring lip can be pivoted into the control element. The space required for the child safety device is reduced by the design of the control element in such a way that the spring lip can be pivoted into an interior of the control element. At the same time, the spring deflection for the spring lip can be limited by the opening or the cavity in the control element. The cavity can thus provide a support means for the spring lip. However, the installation space for implementing a control element in interaction with a control contour can be advantageously reduced by pivoting the spring lip inward.

If within the meaning of the invention reference is made to a control contour, the control contour can be provided, for example, by a correspondingly contoured region of a housing of the locking device. The control element then interacts with the contour or control contour on the housing. Advantageously, the control contour and spring lip are designed in such a way that the end positions or latching positions of the control element can be safely reached and at the same time the control contour can be designed in such a way that the control element can be prevented from remaining in a central position. For example, in the center in the direction of the control element the control contour can have a tip which interacts with a tapered or pointed contour on the spring lip, so that in a central position the control element is in an uncertain, i.e. unstable, position. In any case, the control element will pivot into one of the two latching positions due to the geometric shape of the contours of the control contour and the spring lip. An undefined intermediate position on the control element is effectively prevented by the pointed contour.

If a support means is provided, wherein the support means can be brought into engagement with the control element at least during an adjustment of the control element, this results in a further embodiment variant of the invention. A support means can be, for example, a rear wall of a depression or a cavity or a recess in the control element. Here, the spring lip is bent into the control element by the movement and the interaction with the control contour and rests against the rear wall or the inner opening of the control element. As a result, the spring lip is supported, which enables long-term stability of the spring lip. In this case, the support means is spaced so far from the spring lip that, on the one hand, the spring lip can be supported and, on the other hand, it is ensured that the control contour can be traversed in any way. The spring lip is elastically deformed without experiencing any plastic deformation. This ensures a high level of functional reliability for the child safety locking device, which can also be used in a long-term stable manner.

Another embodiment variant of the invention results when the support means extends into a cavity, in particular a recess, of the control element. The formation of a separate support means on the control element offers a further advantage, namely that the separate support means can also be moved or pivoted. If the spring lip is moved into the adjusting means during pivoting or rotation of the adjusting means, the spring lip engages with the support means, wherein the support means also bends when the spring lip is moved further inward and thus forms an elastic abutment for the spring lip. Consequently, in this embodiment, the adjusting means has two spring elements which interact and support one another. The support means advantageously extends into the cavity of the adjusting means and can, for example, extend into the cavity as a cylindrical or oval pin. When extending, the support means extends at least so far into the cavity that an interaction between the spring lip and the support means is possible. The spring lip and the support means are advantageously arranged opposite one another on the adjusting means.

If the adjusting means has an overall cylindrical shape, wherein the control element extends along a central axis, the spring lip can be arranged at one axial end on the control element, whereas the support means extends from an opposite axial end of the adjusting means in the direction of the spring lip. Due to the interaction of the spring lip and the support means, the force acting on the spring lip is distributed, in particular on the opposite sides of the control element, whereby on the one hand the counterforce acting on the control contour, and thus the force required to move the adjusting means, can be adjusted and at the same time a long-term stability of the control element can be increased or guaranteed by the load distribution.

If the support means can be pivoted by means of the spring lip until the support means abuts the adjusting means, a further advantageous embodiment of the invention results. The force opposing the control contour can be opposed by a further force due to abutment of the support means on the control element. The abutment can also provide a stop for the spring lip, so that excessive deformation of the spring lip can be prevented. The spring lip and the support means cooperate and complement one another in that the support means serves to increase the spring force of the control element.

A further embodiment variant of the invention is achieved when the adjusting means is made of plastics material and is designed in one piece with the spring lip, the thickened portion and the support means. The control element is preferably a plastics injection-molded component and is produced in one piece. If materials such as polybutylene terephthalate (PBT) or polyamide (PA) are usually used, it is also conceivable to use plastics materials with a glass fiber content. Plastics materials with a glass fiber content offer the advantage that higher counterforces against the control contour can be achieved. At the same time, however, the increase in the glass fiber content decreases the elasticity of the material, which in turn reduces the spring deflection of the spring lip or the support means. The longer the spring deflection, the higher the risk of a spring breaking. If the force generated by the adjusting means is not sufficient to provide the required actuating forces on the control element, the spring deflection must be increased. An increase in the spring deflection, in turn, involves the risk of a spring breaking. By the use of the support means for the spring lip, the spring lip can be provided with an additional supporting moment, which minimizes the risk of a spring breaking. Tests have shown that the torque generated on the spring lip could be significantly increased with the use of a support means, with an approx. 25% higher spring force being achievable by the spring lip. If, for example, the torques on the spring lip are recorded while the spring lip is in engagement with the control contour, without support means torques of approx. 30-35 Nm can be measured, whereas when the support means is used, a torque of approx. 45 Nm can be measured on the support means. Consequently, the use of the support means can significantly increase the spring force of the spring lip in relation to the control contour.

If the control element is adjustable, in particular pivotable, with an adjusting means and in particular via an engagement contour, this results in a further embodiment variant of the invention. The adjusting means is in particular an adjusting means for a child safety lock, wherein the adjusting means is arranged in the motor vehicle lock so that it can be adjusted manually and is preferably pivotable. In this case, an engagement contour is preferably used to pivot the adjusting means and to engage or disengage a child safety device. The engagement contour can be designed, for example, in the form of a slot, so that the adjusting means can be adjusted by means of a keyring or a screwdriver. The engagement contour can preferably be reached from the outside and even more preferably from the region of a door rebate of the opened rear side door.

It can also be advantageous if the control element has an actuating contour, in particular an actuating lever. The control element is used to engage the child safety device and interacts in the motor vehicle lock, for example, with a mechanism for internal actuation of the motor vehicle lock. For this purpose, the internal actuation has an internal door handle which preferably actuates a release lever via an internal actuating lever. The locking mechanism can then be unlocked and the door can be opened by means of the release lever. The internal actuation chain is interrupted by means of the child safety device, so that internal actuation, i.e. opening of the lock, can be prevented. An actuating contour formed on the control element can interrupt the internal actuation chain and thus can ensure child safety. The actuating contour is advantageously designed in one piece with the control element and can be designed, for example, as an actuating lever. The actuating contour advantageously has a control contour, and in particular an eccentric control contour, so that a continuous introduction of force into the actuating lever chain can be made possible.

The invention is explained in more detail in the following with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims, individually or in combination.

DETAILED DESCRIPTION

Figure 1:
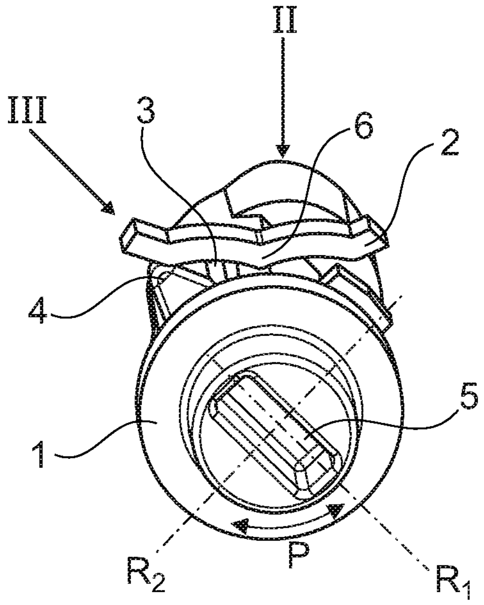
FIG. 1 is a three-dimensional view of an adjusting means in engagement with a control contour and a view of an engagement contour of the control element.

A three-dimensional view of a control element 1 is shown in FIG. 1, wherein the control element 1 is in engagement with a control contour 2, wherein the control contour 2 can be part of a lock housing, for example. The control element 1 is shown in a first end position of a latching position R1, in which the spring lip 3 is in a relaxed position. A thickened portion 4 that can be described as pointed protrudes from the control contour 2, so that a first latching position R1 is assumed by the control element 1. The control element 1 can be pivoted clockwise in the direction of the arrow P and starting from the first latching position R1 shown in FIG. 1, so that the control element assumes the second latching position R2. The latching positions R1, R2 are illustrated in FIG. 1 by the position of an engagement contour 5. The latching position R1 corresponds, for example, to the functional position "child safety lock engaged," whereas the latching position R2 reproduces the functional position of the control element 1 in which the child safety device is disengaged.

When the control element 1 is pivoted, the spring lip 3 or the thickened portion 4 is guided along the control contour 2. The control contour 2 forms a fixed abutment and is, for example, part of the lock housing. During the pivoting of the control element 1 in the clockwise direction, the thickened portion 4 or the spring lip 3 is pivoted into the control element or bent into the control element 1. The maximum pivoting of the spring lip 3 takes place in the center 6 of the control contour 2, wherein the spring lip 3 is pivoted to a maximum extent into the control element 1.

Figure 2:
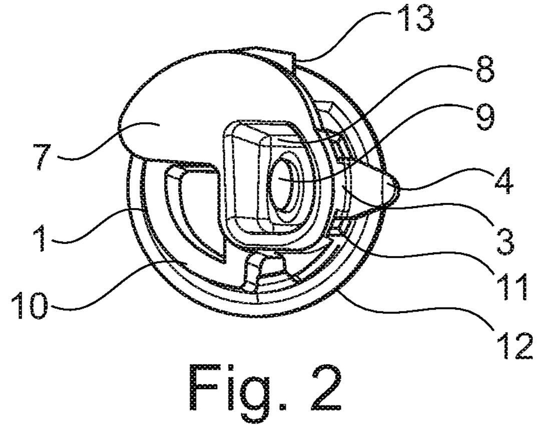
FIG. 2 is a three-dimensional view of the control element from the direction of the arrow II from FIG. 1, showing a view of the cavity in the control element with the support means arranged in the cavity.

A view of the control element 1 from the perspective of the arrow II from FIG. 1 is shown in FIG. 2. An actuating contour 7 formed in one piece on the control element 1, a cavity 8, a support means 9, a guide surface 10 and a recess 11 can be seen, wherein the recess 11 extends around the spring lip 3 and the thickened portion 4. It can be clearly seen that the support means 9 extends into the cavity as an oval support means 9. The cavity 8 surrounds the support means 9 circumferentially so that, on the one hand, a spring deflection for the spring lip 3 and, on the other hand, a spring deflection for the support means 9 are provided. The guide surface 10, with an edge 12 of the control element 1, forms a guide and fastening means for the control element 1, wherein at the same time the guide surface 10 can also provide, for example, a stop 13 for the control element 1.

Figure 3:
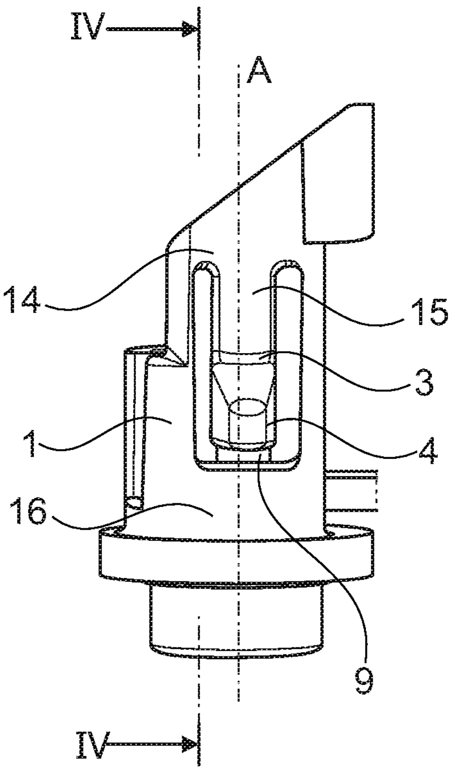
FIG. 3 is a view of the control element according to FIG. 1 from the direction of the arrow III, showing the control element in its axial extent and in a side view.

A side view of the control element 1 is shown in FIG. 3. It can be seen that the control element 1 can be described as substantially cylindrical and extending along an axis A. However, it can also be seen clearly that the spring lip 3 extends, starting from a first axial end 14 of the control element 1, in the direction of the engagement contour 5, wherein the spring lip 3 has a first region 15 which is made of the same material with a uniform thickness. This first region 15 can also be described as a spring region 15.

The spring region 15 is followed by a continuously thickened region which ends almost in a point so that the spring lip 3 ends in a thickened portion 4. The thickened portion 4 is provided with a radius at the end, which enables easy sliding on the control contour 2. In particular, the radius on the thickened portion 4 can serve to move the control element slightly, but also to minimize noise during the adjustment of the control element 1. The support means 9 extends from a further axial end 16 of the control element 1 in the direction of the spring lip 3. The spring lip 3 and the support means 9 are thus formed opposite one another on the control element 1.

Figure 4:
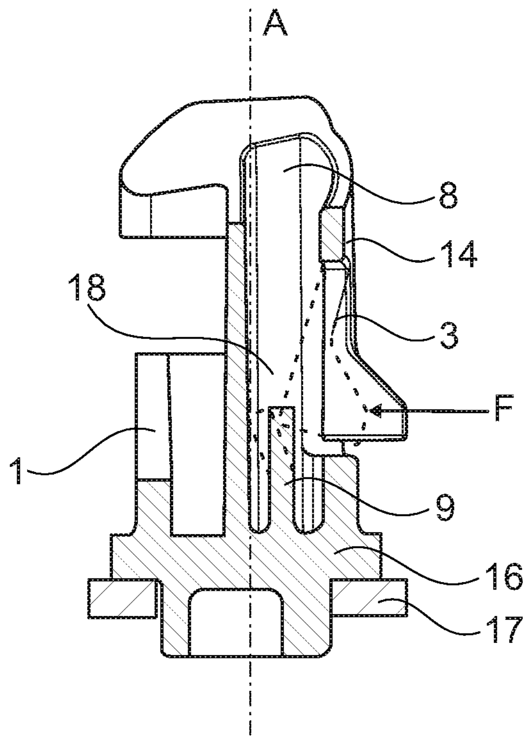
FIG. 4 is a section through the control element along the line IV-IV from FIG. 3 with an additional representation of an actuated spring lip or a support means.

A section along the line IV-IV from FIG. 3 is shown in FIG. 4. The opposing connection regions 14, 16 for the spring lip 3 and the support means 9 on the control element 1 can be clearly seen. If the control element 1 is now moved from the first latching position R1 into the second latching position R2, the spring lip 3 in the center 6 of the control contour 2 is pivoted to a maximum extent into the cavity 8. The pivoting inward takes place via a force F, which introduces the housing 17 or the control contour 2 on the housing 17 into the control element 1. As a result of the force F, the spring lip 3 is bent or pivoted into the cavity 8, wherein the spring lip 3 comes into engagement with the support means 9.

The position of the spring lip 3 and the support means 9 in the maximum pivoted position is additionally shown as a dashed line in FIG. 4. It can be seen that a rear wall 18 of the cavity 8 offers a stop surface 18 for the support means 9. The support means 9 thus serves as an abutment for the spring lip 3, wherein the support means can support itself on the cavity 8. As a result, maximum long-term stability of the control element 1 is provided and higher spring forces can be implemented on the control element 1. The construction according to the invention of the control element from the spring lip 3 and the support means 9 thus increases the functional reliability, the spring force and the long-term stability of the control element. Consequently, a high degree of functional reliability can also be achieved with higher-strength plastics material, in particular glass-fiber reinforced plastics materials.

LIST OF REFERENCE SIGNS

1 control element
2 control contour
3 spring lip
4 thickened portion
5 engagement contour
6 center of the control contour
7 actuating contour
8 cavity
9 support means
10 guide surface
11 recess
12 edge
13 stop
14, 16 axial end
15 first region, spring region
17 housing
18 wall, stop surface
R1, R2 latching position
P arrow
A axis
F force

The invention claimed is:

1. A motor vehicle locking device comprising:
a child safety device having a control element that includes a spring element; and
a support,
wherein:
the control element is latchable in at least two latching positions, and the spring element interacts with a control contour in such a way that the control element is adjustable in a spring-loaded manner into either of the latching positions,
the spring element is a spring lip,
the control element includes a cavity that extends within the control element,
the support extends in the cavity, and
the support is brought into engagement with the spring element at least while the control element is being adjusted,
wherein the control element is in engagement with a control contour that is part of a locking housing.

2. The motor vehicle locking device according to claim 1, wherein the spring lip has a thickened portion configured as a spring tab.

3. The motor vehicle locking device according to claim 1, wherein the spring lip is pivotable into the control element.

4. The motor vehicle locking device according to claim 1, wherein the support is pivotable by the spring lip until the support abuts a stop surface of the control element.

5. The motor vehicle locking device according to claim 1, wherein the control element is made of a plastics material and is configured in one piece with the spring lip and the support.

6. The motor vehicle locking device according to claim 1, wherein the spring lip and the support are formed opposite one another on the control element.

7. The motor vehicle locking device according to claim 6, wherein the control element is pivotable via an engagement contour to adjust the control element.

8. The motor vehicle locking device according to claim 1, wherein the control element includes a guide surface that acts as a stop for the control element.

9. The motor vehicle locking device according to claim 1, wherein the control element is cylindrical.

10. The motor vehicle locking device according to claim 1, wherein the support is further brought into engagement with a wall of the cavity.

11. The motor vehicle locking device according to claim 1, wherein the spring element defines a portion of the cavity.

12. A motor vehicle locking device comprising:
a child safety device having a control element that includes a spring element; and
a support,
wherein:
the control element is latchable in at least two latching positions, and the spring element interacts with a control contour in such a way that the control element is adjustable in a spring-loaded manner into either of the latching positions,
the spring element is a spring lip,
the control element includes a cavity that extends within the control element,
the support extends in the cavity, and
the support is brought into engagement with the spring element at least while the control element is being adjusted,
wherein the spring element defines a portion of the cavity.

* * * * *